(12) United States Patent
Kannan et al.

(10) Patent No.: US 8,440,769 B2
(45) Date of Patent: May 14, 2013

(54) POLYESTER STILBENE COMPOSITION

(75) Inventors: Ganesh Kannan, Evansville, IN (US); Steven James Montgomery, Evansville, IN (US)

(73) Assignee: Sabic Innovative Plastics IP B.V. (NL)

( * ) Notice: Subject to any disclaimer, the term of this patent is extended or adjusted under 35 U.S.C. 154(b) by 664 days.

(21) Appl. No.: 11/503,331

(22) Filed: Aug. 11, 2006

(65) Prior Publication Data

US 2007/0037958 A1    Feb. 15, 2007

Related U.S. Application Data

(62) Division of application No. 11/204,277, filed on Aug. 15, 2005, now Pat. No. 7,105,627.

(51) Int. Cl.
  *C08L 69/00* (2006.01)
  *C08G 63/64* (2006.01)

(52) U.S. Cl.
  USPC ............ 525/439; 525/425; 528/304; 528/306

(58) Field of Classification Search ................... 525/439, 525/425; 528/304, 306
  See application file for complete search history.

(56) References Cited

U.S. PATENT DOCUMENTS

| | | | |
|---|---|---|---|
| 2,657,195 A | 10/1953 | Toland | |
| 3,496,839 A * | 2/1970 | Hartle | 522/165 |
| 4,073,777 A | 2/1978 | O'Neill et al. | |
| 4,414,382 A | 11/1983 | Morris et al. | |
| 4,420,607 A | 12/1983 | Morris et al. | |
| 4,459,402 A | 7/1984 | Morris et al. | |
| 4,468,510 A | 8/1984 | Morris et al. | |
| 4,551,520 A | 11/1985 | Morris et al. | |
| 4,619,976 A | 10/1986 | Morris et al. | |
| 4,696,990 A | 9/1987 | Noonan et al. | |
| 4,728,717 A | 3/1988 | Morris et al. | |
| 4,728,718 A | 3/1988 | Morris et al. | |
| 4,728,719 A | 3/1988 | Morris et al. | |
| 4,728,720 A | 3/1988 | Morris et al. | |
| 4,824,931 A | 4/1989 | Morris et al. | |
| 4,906,709 A | 3/1990 | Morris et al. | |
| 5,006,613 A | 4/1991 | Shepherd et al. | |
| 5,081,220 A | 1/1992 | Morris et al. | |
| 5,194,574 A | 3/1993 | Morris et al. | |
| 5,254,610 A | 10/1993 | Small, Jr. et al. | |
| 5,614,599 A | 3/1997 | Bales et al. | |
| 5,804,617 A | 9/1998 | Hoffman et al. | |
| 5,942,585 A * | 8/1999 | Scott et al. | 525/439 |
| 6,537,679 B1 | 3/2003 | Buoni et al. | |
| 6,657,018 B1 * | 12/2003 | Hoover | 525/464 |
| 2002/0154406 A1 | 10/2002 | Merrill et al. | |

FOREIGN PATENT DOCUMENTS

| | | |
|---|---|---|
| EP | 0375575 | 4/1990 |
| EP | 0537577 | 4/1993 |
| EP | 0857749 A1 | 8/1998 |
| WO | WO 93 22363 | 11/1993 |
| WO | WO 93/22363 | 11/1993 |
| WO | WO 93/22384 | 11/1993 |

OTHER PUBLICATIONS

"Compatible blends of copolyesters and polyarylates", Reserach Disclosure, Mason Publications, Hamshire, GB, vol. 298, No. 6, May 1988.

International Search Report and Written Opinion; International Application No. PCT/US2006/030134; International Filing Date Aug. 2, 2006; Date of Mailing: Nov. 13, 2006; 9 pages.

International Search Report and Written Opinion; International Application No. PCT/US2006/031679; International Filing Date Aug. 14, 2006; Date of Mailing: Dec. 11, 2006; 8 pages.

* cited by examiner

*Primary Examiner* — Ling Choi
*Assistant Examiner* — Gennadiy Mesh
(74) *Attorney, Agent, or Firm* — Cantor Colburn LLP

(57) ABSTRACT

A copolyester composition comprising units of residues of a) about 1-40 mole % of trans 3,3', trans 4,4' stilbene dicarboxylic acid and the combination thereof, b) about 99-60 mole % of cis,trans, and the combination thereof of 1,4 cyclohexane dicarboxylic acid, and c) about 50-100 mole % of cis, trans, and the combination thereof of 1,4-cyclohexane dimethanol. The resulting copolyester may be characterized by its clarity, as well as enhanced heat performance due to the presence of the stilbene moiety.

9 Claims, 1 Drawing Sheet

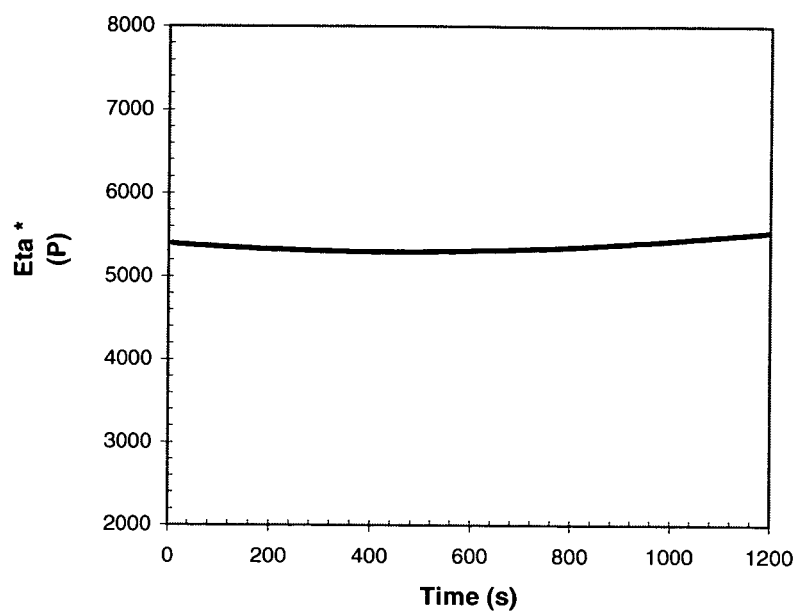

POLYESTER STILBENE COMPOSITION

CROSS REFERENCE TO RELATED APPLICATIONS

This application is a divisional of application Ser. No. 11/204,277 filed on Aug. 15, 2005 now U.S. Pat. No. 7,105,627.

BACKGROUND OF THE INVENTION

Many polymer systems are utilized for their inertness to various use conditions. The more reactive a polymer with its surroundings the less stable it is, thus becoming potentially less desirable for its intrinsic characteristics.

One desirable polymer system is melt processible under ordinary circumstances but also has the potential to become reactive with itself or other moieties in a controlled manner for changing its characteristics.

SUMMARY OF THE INVENTION

According to an embodiment, the polyester resin comprises the residue of trans 4,4' stilbene dicarboxylic acid, trans 3,3' stilbene dicarboxylic acid or combination or mixture thereof.

According to an embodiment, the copolyester is characterized by its clarity, as well as enhanced heat performance due to the presence of the stilbene moiety.

According to an embodiment, there is provided a copolyester comprising units of residues of a) about 1-40 mole % of trans 3,3', trans 4,4' stilbene dicarboxylic acid and the combination thereof, b) about 99-60 mole % of cis,trans, and the combination thereof of 1,4 cyclohexane dicarboxylic acid, and c) about 50-100 mole % of cis, trans, and the combination thereof of 1,4-cyclohexane dimethanol.

According to an embodiment, optional ingredients may include 0 to about 40 mole % of terephthalic acid, isophthalic acid and the combination thereof, 0 to about 50 mole % of ethylene glycol, butylene glycol and the combination thereof, and about 0-2% of a branching agent that is at least trifunctional.

A further embodiment is a crosslinked polymer of the above described copolymer, at least one of the chains of the copolymer attached to another through the olefinic unsaturation of the stilbene moiety thereby making a cyclobutyl linkage between the chains, thus providing a crosslinked copolymer. The attachment is schematically represented by the formula below wherein the crosslinked polymer is prepared by ultraviolet radiation.

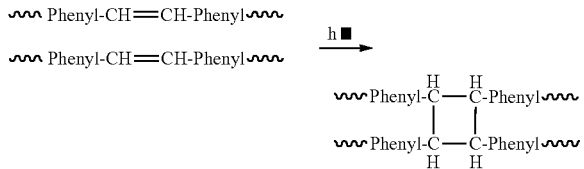

Another embodiment is blends of the copolyester previously described with a polymer selected from the group consisting of aromatic polycarbonate, copolyesterscarbonate, siloxane containing polycarbonate, polyester and mixtures thereof.

DESCRIPTION OF THE DRAWINGS

FIG. Plots Eta* (Viscosity) relative to Time at 250° C. of a copolyester containing 10 mole % 4,4'-stilbenedicarboxylicacid, 90 mole %, 1,4-cyclohexanedicarboxylic acid and 100% 1,4-cyclohexanedimethanol.

DETAILED DESCRIPTION OF THE INVENTION

The stilbene dicarboxylic acid molecule is preferably trans 3,3', trans 4,4' or mixtures thereof. The molecule is more preferably trans 4,4'.

The cyclohexane carboxylic acid is preferably cis trans mixtures.

The copolyester is characterized by its clarity, as well as increased heat performance due to the presence of the stilbene moiety. The larger the stilbene presence, the higher the temperature performance, e.g. $T_g$ and HDT. Generally about 1-40 mole % of the acid units in the polymer are stilbene dicarboxylic acid. It is preferred to have at least about 5 mole percent of the acid units as stilbene dicarboxylic acid. Generally, about 30 mole % of the acid being stilbene dicarboxylic acid is a preferred maximum.

Preferably about 95 to 70 mole % of the acid units are cis, trans, and the combination thereof of 1,4-cyclohexane dicarboxylic acid.

The 1,4-cyclohexanedimethanol is cis, trans and the combination thereof. It is present in the copolyester in quantities of about 50-100 mole %. A further aspect of the invention is a minimum quantity of at least about 60 mole % or about 70 mole % of the material.

As mentioned previously terephthalic and isophthalic acid can be present from 0 up to about 40 mole % of terephthalic acid, isophthalic acid and the combination thereof. Generally, no more than about 25 mole % of either or both is in the polymer. Additional dicarboxylic acids such as aromatic dicarboxylic acid containing 8-20 carbon atoms and aliphatic dicarboxylic acids containing 3-20 atoms can also be present. Examples of such diacids include 4,4'-biphenyldicarboxylicacid, maleic acid, adipic acid, suberic acid and dodecanedicarboxlic acid. Generally, no more than about 25 mole % of these dicarboxylic acids are present. All these levels are obtained by replacing the cyclohexane 1,4-dicarboxylic acid. Whatever quantity is present, the essential characteristics of clarity and heat of the polymer should be present.

The 1,4-cyclohexane dimethanol is preferably a cis trans mxture. Additionally quantities of ethylene glycol and/or butylene glycol can be present in the molecule, up to about 50 mole % of ethylene glycol, butylene glycol and the combination thereof. Generally, no more than about 40 mole % total or about 30 mole % total of said glycol(s) are present. Additional diols containing 2-16 carbon atoms can also be present. Examples of such diols include 1,3-propanediol, neopentyl glycol, 1,5-pentanediol, 1,6-hexanediol and p-xylene glycol. Generally, no more than 30 mole % of these diols are present. All these levels are reached by replacement of cyclohexane dimethanol. The essential characteristics of clarity and heat of the polymer should be maintained.

Branched copolyesters can be prepared by the incorporation of a trifunctional or greater functionality polyester branching agent. Examples of such agents include trimellitic anhydride, trimesic acid, pentaerythritol, trimethylolpropane and the like.

The copolyester of the invention is prepared by polymerization of the dicarboxylic acids or esters thereof of the desired acid unit including stilbene in combination with the desired diol(s). Standard polyester polymerization conditions are employed. The claim language utilizes "residues" of the acid, alcohol or glycol, respectively. This only identifies the actual structure of the moiety. It does not identify the synthetic precursor or pathway to arrive at the residue. Any synthetic pathway can be used.

The crosslinked polymer of the copolyester of the invention is prepared by exposure of the polyester to radiation, especially ultraviolet radiation, generally at about 365 nm. Temperature is not unduly significant and the reaction can occur at room temperature and at temperatures below the $T_g$ of the polymer. Exposure to sunlight for a period of time is also effective.

Blends of the invention copolyester can be accomplished with a variety of other polymers. Miscible blends can be prepared with varied amounts of polycarbonate, copolyestercarbonate, silicone containing polycarbonate copolymers and polyesters. Examples of aromatic polycarbonates include bisphenol-A polycarbonate as well as polycarbonates of other diphenols. Copolyestercarbonates include copolymers of 1,3-resorcinol, isophthalic acid/terephthalic acid and bpapolycarbonate referenced in U.S. Pat. No. 6,559,270 B1. Examples of a silicone containing polycarbonate copolymer can be found in U.S. Pat. No. 5,448,086 and U.S. Pat. No. 6,657,018. An example of a miscible polyester is poly(1,4-cyclohexylenedimethylene 1,4-cyclohexanedicarboxylate) (PCCD). It should be noted that the above blends can be irradiated as previously described and the invention copolyester therein will become crosslinked to at least a certain extent.

EXAMPLE 1

This example illustrates the synthesis of a polymer consisting of 90 mol % 1,4-cyclohexane dicarboxylic acid units, 10 mol % trans-4,4'-stilbenedicarboxylic acid units, and 100 mol % of 1,4-cyclohexane dimethanol.

A mixture of 100 g (0.50 mol) of 1,4-dimethylcyclohexanedicaroxylate, 16.44 g (0.05 mol) of dimethyl trans-4,4'-stilbenedicarboxylate, and 79.79 g (0.55 mol) 1,4-cyclohexanedimethanol and 0.23 g of titanium tetraisopropoxide is placed in a 500 mL flask equipped with a nitrogen inlet, metal paddle stirrer, and short distillation column. The flask is heated gradually to 250° C. over a period of around 30 minutes. Once the overhead distillation slows, vacuum of 0.5 torr is applied gradually to the reaction. Full vacuum is maintained for round 20 minutes. A high melt viscosity clear polymer with an I.V. of 0.83 is obtained.

EXAMPLE 2

This example illustrates the synthesis of a polymer consisting of 80 mol % cyclohexane dicarboxylic acid units, 20 mol % trans-4,4'-stilbenedicarboxylic acid units, and 100 mol % of cyclohexane dimethanol.

A mixture of 17.2 lbs. (39.0 mol) of 1,4-dimethylcyclohexanedicaroxylate, 6.4 lbs. (9.7 mol) of dimethyl trans4,4'-stilbenedicarboxylate, and 15.4 lbs. (48.5 mol) 1,4-cyclohexanedimethanol and 14 g of titanium tetraisopropoxide is placed in a 15 gallon reactor equipped with a nitrogen inlet, helical stirrers, and short distillation column. The reactor is heated gradually to 250° C. over a period of around 1 hour. Once the overhead distillation slows, vacuum of 1.5 torr is applied gradually to the reaction. Full vacuum is maintained for around 30 minutes. A high melt viscosity clear polymer with an I.V. of 0.88 is obtained.

Tg Measurements

A series of copolyesters was synthesized with varying composition. The $T_g$ data is presented in Table 1.

SB refers to the 4,4'-stilbenedicarboxylic acid

DMCD is dimethyl 1,4-cyclohexanedicarboxylate (98% trans)

CHDM is 1,4 cyclohexanedimethonal (70% trans)

TABLE 1

| Reaction Number | SB mole % | DMCD mole % | CHDM mole % | $T_g$ ° C. | IV dL/g |
|---|---|---|---|---|---|
| 1 | 0 | 100 | 100 | 71 | 0.84 |
| 2 | 2 | 98 | 100 | 74 | 0.85 |
| 3 | 5 | 95 | 100 | 77 | 0.82 |
| 4 | 10 | 90 | 100 | 83 | 0.83 |
| 5 | 20 | 80 | 100 | 93 | 0.88 |

Tg (Glass Transition Temperature) measured by DSC
Intrinsic Viscosity (IV) is measured in a Phenol/1,1,2,2-Tetrachloroethane 60/40 (wt./wt.) at 25° C.

Gel Content

Upon exposure to ultraviolet radiation of about 365 nm, crosslinking occurs in the above copolyesters synthesized with stilbene dicarboxylate monomer. Resins were exposed to UV light at room temperature for varying lengths of time. In thin films, gel contents of 100% were measured in dichloromethane. Similar results are also obtained by exposing parts made from these resins to sunlight.

Blends

Completely miscible blends were made by melt mixing polycarbonate/poly(diorganosiloxane) copolymer with copolyester stilbene described herein copolymers as well as the stilbene copolyester with polycarbonate, and/or copolymers of 1,3-resorcinol and polycarbonate. These blends were proven to be miscible throughout the entire composition range by the appearance of only one glass transition temperature upon the second heating on DSC.

In Table 2 an example of blend data before and after UV radiation is described. The blends consist of the copolyester of Example 1 with BPA Polycarbonate. Upon exposure to UV radiation, an increase in Tg results in the copolyester as well as the blends with polycarbonate due to the presence of the copolyester as shown by the Tg of the neat polycarbonate which remains unchanged.

TABLE 2

| | SB Resin* wt % | PC** wt % | Tg ° C. | UV Tg ° C. | ΔTg ° C. |
|---|---|---|---|---|---|
| 1 | 100 | 0 | 78.7 | 82 | 3.3 |
| 2 | 80 | 20 | 89.4 | 92 | 2.6 |
| 3 | 60 | 40 | 102.4 | 104 | 1.6 |
| 4 | 0 | 100 | 152.7 | 152.6 | −0.1 |

*SB Resin is the same composition as the copolyester in Example 1
**PC is BPA Polycarbonate
UV Tg = Tg after UV Irradiation Articles Articles can be prepared from the copolymer and blends thereof. These articles can be prepared using various techniques such as injection molding, film and sheet extrusion, film and sheet coextrusion, blow molding, coating, powder coating and the like. Crosslinking of the copolyester can be carried out on the articles after formation.

Thermal Stability

The crosslinkable copolyester material is highly thermally stable as illustrated by the data in FIG. 1 measuring Eta* (viscosity) relative to Time at 250° C. The results were obtained using an ARES strain controlled parallel plate rheometer, under nitrogen, plate diameter of 25 mm and gap of 1.0 mm.

Summary

These samples illustrate that melt stable polymers and blends can be prepared such that useful parts and applications can be made. The resulting articles can be photo-crosslinked to exhibit improved properties such as heat and dimensional stability.

Mechanical Properties Before and After Crosslinking

In Tables 3 and 4, the Flexural Strength, Notched Izod and Heat Distortion Temperatures are presented for two copolymer compositions. The same mechanical properties are also measured for the resins after crosslinking by UV radiation to a gel content of around 50%. The flexural strength of the resins increased with crosslinking, while the break when measured by notched izod remained ductile. It is also important to note the HDT measured at 66 psi also increases for each material upon crosslinking.

SB refers to the 4,4'-stilbenedicarboxylic acid
DMCD is dimethyl 1,4-cyclohexanedicarboxylate (98% trans)
CHDM is 1,4 cyclohexanedimethonal (70% trans)

TABLE 3

| Composition* | | Gel | Flexural Strength | Notched Izod | HDT @ 66 psi |
|---|---|---|---|---|---|
| SB % | DMCD % | Content** % | psi | (RT) ft-lbf | Deg C. |
| 1 | 10 | 90 | 0 | 7370 | 17.9 | 64.6 |
| 2 | 10 | 90 | 50 | 7970 | 18.3 | 69.8 |

TABLE 4

| Composition* | | Gel | Flexural Strength | Notched Izod | HDT @ 66 psi |
|---|---|---|---|---|---|
| SB % | DMCD % | Content** % | psi | (RT) ft-lbf | Deg C. |
| 3 | 20 | 80 | 0 | 7710 | 12.4 | 69.5 |
| 4 | 20 | 80 | 50 | 8870 | 11.1 | 77.2 |

*Refers to the composition of the carboxylate portion of the polymer. Diol portion is 100% CHDM.
**Gel Content calculated by insoluble resin in dichloromethane (determined gravimetrically).

The invention claimed is:

1. A composition consisting essentially of a miscible blend of:
(A) a copolyester, at least partially crosslinked, consisting of repeating units of residues of
a. from about 1 to about 40 mole % of trans 3,3' or trans 4,4'-stilbene dicarboxylic acid, based on the total moles of acid units,
b. from about 99 to about 60 mole % of cis, trans, or a combination thereof of 1,4-cyclohexane dicarboxylic acid, based on the total moles of acid units,
c. from 0 to about 40 mole % of terephthalic acid, isophthalic acid, or a combination thereof, based on the total moles of acid units,
d. from about 50 to about 100 mole % of cis, trans, or a combination thereof of 1,4-cyclohexane dimethanol, based on the total moles of diol units,
e. from 0 to about 50 mole % of ethylene glycol, butylene glycol, or a combination thereof, based on the total moles of diol units, and
f. from 0 to about 2 mole % of a branching agent; and
(B) a polymer selected from the group consisting of polycarbonate, copolyestercarbonate, silicone containing polycarbonate, poly(1,4-cyclohexylenedimethylene 1,4-cyclohexanedicarboxylate, polycarbonate/poly(diorganosiloxane)copolymer, 1,3-resorcinol containing polycarbonate copolymer and mixtures thereof.

2. The composition of claim 1 wherein the copolyester has from about 5 to about 30 mole % of the residue of trans 4,4' stilbene dicarboxylic acid in the copolyester, based on the total moles of acid units.

3. The composition of claim 1, wherein the copolyester has from 0 to about 25 mole % of the residue of terephthalic acid, isophthalic acid and a combination thereof, based on the total moles of acid units.

4. The composition of claim 1, wherein the copolyester has from 0 to about 30 mole % of the residues of ethylene glycol, butylene glycol and a combination thereof, based on the total moles of diol units.

5. The composition of claim 1, wherein the copolyester is clear.

6. A process for preparing the composition of claim 1, consisting essentially of a miscible blend, wherein the copolyester is mixed with the polymer selected from the group consisting of polycarbonate, copolyestercarbonate, silicone containing polycarbonate, poly(1,4-cyclohexylenedimethylene 1,4-cyclohexanedicarboxylate, polycarbonate/poly(diorganosiloxane)copolymer, 1,3-resorcinol containing polycarbonate copolymer and mixtures thereof, and then the blend is irradiated, thereby forming at least some crosslinked copolyester.

7. A composition consisting essentially of a clear miscible blend of:
(A) a copolyester comprising repeating units of residues of
a. from about 5 to about 30 mole % of trans 3,3' or trans 4,4'-stilbene dicarboxylic acid, based on the total moles of acid units,
b. from about 95 to about 70 mole % of cis, trans, or a combination thereof of 1,4-cyclohexane dicarboxylic acid, based on the total moles of acid units,
c. from 0 to about 40 mole % of terephthalic acid, isophthalic acid, or a combination thereof, based on the total moles of acid units,
d. from about 50 to about 100 mole % of cis, trans, or a combination thereof of 1,4-cyclohexane dimethanol, based on the total moles of diol units,
e. from 0 to about 50 mole % of ethylene glycol, butylene glycol, or a combination thereof, based on the total moles of diol units, and
f. from 0 to about 2 mole % of a branching agent; and
(B) a polymer selected from the group consisting of bisphenol-A polycarbonate, copolyestercarbonate, silicone containing polycarbonate, poly(1,4-cyclohexylenedimethylene 1,4-cyclohexanedicarboxylate, polycarbonate/poly(diorganosiloxane)copolymer, 1,3-resorcinol containing polycarbonate copolymer and mixtures thereof, wherein the copolyester is at least partially crosslinked.

8. The composition of claim 7 wherein the copolyester comprises from 10 mole % to 30 mole % or trans 4,4' stilbene dicarboxylic acid, based on the total moles of acid units.

9. The method of claim 6 wherein the copolyester is mixed with a polymer selected from the group consisting of bisphenol-A polycarbonate, copolyestercarbonate, silicone containing polycarbonate, poly(1,4-cyclohexylenedimethylene 1,4-cyclohexanedicarboxylate, polycarbonate/poly(diorganosiloxane)copolymer, 1,3-resorcinol containing polycarbonate copolymer and mixtures thereof, and then the blend is irradiated, thereby forming at least some crosslinked copolyester.

* * * * *